US009970603B2

(12) United States Patent
Sun et al.

(10) Patent No.: US 9,970,603 B2
(45) Date of Patent: May 15, 2018

(54) ENERGY STAR COMPLIANT LED LAMP

(71) Applicant: TSMC Solid State Lighting Ltd., Hsinchu (TW)

(72) Inventors: Chih-Hsuan Sun, Kaohsiung (TW); Wei-Yu Yeh, Tainan (TW); Hsueh-Hung Fu, Hsinchu (TW); Dong Jung Suen, Guishan (TW)

(73) Assignee: Epistar Corporation, Hsinchu (TW)

( * ) Notice: Subject to any disclaimer, the term of this patent is extended or adjusted under 35 U.S.C. 154(b) by 680 days.

(21) Appl. No.: 14/200,069

(22) Filed: Mar. 7, 2014

(65) Prior Publication Data

US 2014/0185301 A1 Jul. 3, 2014

Related U.S. Application Data

(63) Continuation of application No. 13/313,153, filed on Dec. 7, 2011, now Pat. No. 8,668,366.

(51) Int. Cl.

*B60Q 1/06* (2006.01)
*F21K 99/00* (2016.01)

(Continued)

(52) U.S. Cl.

CPC ................ *F21K 9/50* (2013.01); *B05D 5/061* (2013.01); *B05D 5/063* (2013.01); *F21K 9/20* (2016.08);

(Continued)

(58) Field of Classification Search

CPC ...... F21V 3/0445; F21V 3/0472; F21V 3/049; F21V 7/0016; F21V 29/773; F21V 29/74;

(Continued)

(56) References Cited

U.S. PATENT DOCUMENTS 2,744,209 A 5/1956 Ferguson
4,047,020 A * 9/1977 Noren ....................... F21V 9/08 340/815.76

(Continued)

FOREIGN PATENT DOCUMENTS

CN 201663174 12/2010
JP 2010176890 8/2010

(Continued)

*Primary Examiner* — Elmito Breval
*Assistant Examiner* — Meghan Ulanday
(74) *Attorney, Agent, or Firm* — Muncy, Geissler, Olds & Lowe, P.C.

(57) ABSTRACT

The present disclosure provides an illumination device. The illumination device includes a cap structure. The cap structure is partially coated with a reflective material operable to reflect light. The illumination device includes one or more lighting-emitting devices disposed within the cap structure. The light-emitting devices may be light-emitting diode (LED) chips. The illumination device also includes a thermal dissipation structure. The thermal dissipation structure is coupled to the cap structure in a first direction. The thermal dissipation structure and the cap structure have a coupling interface. The coupling interface extends in a second direction substantially perpendicular to the first direction. The thermal dissipation structure has a portion that intersects the coupling interface at an angle. The angle is in a range from about 60 degrees to about 90 degrees according to some embodiments.

18 Claims, 7 Drawing Sheets

(51) Int. Cl.

| | |
|---|---|
| ***F21V 3/04*** | (2018.01) |
| ***F21V 7/00*** | (2006.01) |
| ***B05D 5/06*** | (2006.01) |
| ***F21V 29/74*** | (2015.01) |
| ***F21V 29/77*** | (2015.01) |
| ***F21K 9/20*** | (2016.01) |
| ***F21K 9/232*** | (2016.01) |
| ***F21K 9/60*** | (2016.01) |
| ***F21K 9/66*** | (2016.01) |
| *F21Y 101/00* | (2016.01) |
| *F21Y 115/10* | (2016.01) |

(52) U.S. Cl.

CPC ................ *F21K 9/232* (2016.08); *F21K 9/60* (2016.08); *F21K 9/66* (2016.08); *F21V 3/049* (2013.01); *F21V 3/0445* (2013.01); *F21V 3/0472* (2013.01); *F21V 7/0016* (2013.01); *F21V 29/74* (2015.01); *F21V 29/773* (2015.01); *F21Y 2101/00* (2013.01); *F21Y 2115/10* (2016.08)

(58) Field of Classification Search

CPC ... F21K 9/10; F21K 9/135; F21K 9/50; B05D 5/061; B05D 5/063

USPC .......... 362/235, 294, 296.01, 297, 298, 300, 362/311.01, 341, 345, 346

See application file for complete search history.

(56) References Cited

U.S. PATENT DOCUMENTS

| | | | |
|---|---|---|---|
| 2011/0170302 A1 | 7/2011 | Breidenassel et al. | |
| 2011/0215699 A1* | 9/2011 | Le | F21V 3/00 313/46 |
| 2012/0188771 A1 | 7/2012 | Kraus et al. | |
| 2012/0313500 A1 | 12/2012 | Breidenassel et al. | |
| 2013/0094180 A1 | 4/2013 | Sun et al. | |

FOREIGN PATENT DOCUMENTS

| | | |
|---|---|---|
| TW | M379722 U1 | 5/2010 |
| WO | WO 2011/041667 A1 | 4/2011 |

* cited by examiner

ENERGY STAR COMPLIANT LED LAMP

PRIORITY DATA

The present application is a continuation application of U.S. patent application Ser. No. 13/313,153, filed on Dec. 7, 2011, entitled "Energy Star Compliant LED Lamp", the disclosure of which is hereby incorporated by reference in its entirety.

TECHNICAL FIELD

The present disclosure relates generally to light-emitting devices, and more particularly, to a more efficient light-emitting diode (LED) illumination device.

BACKGROUND

LED devices are semiconductor photonic devices that emit light when a voltage is applied. LED devices have increasingly gained popularity due to favorable characteristics such as small device size, long lifetime, efficient energy consumption, and good durability and reliability. In recent years, LED devices have been deployed in various applications, including indicators, light sensors, traffic lights, broadband data transmission, and illumination devices. For example, LED devices are often used in illumination devices provided to replace conventional incandescent light bulbs, such as those used in a typical lamp. These illumination devices require a relatively wide amount of light distribution, similar to that provided by conventional incandescent light bulbs. However, conventional LED devices may have some limitations in that regard, because light emitted from the LED devices is usually distributed in a relatively small angle, which provides a narrow angle of light and is dissimilar to natural illumination or some types of incandescent illumination devices. As such, conventional LED illumination devices may not be able to offer a true replacement for incandescent illumination devices.

Therefore, while conventional LED illumination devices are generally adequate for their intended purposes, they have not been entirely satisfactory in every aspect. It is desired to provide an LED illumination device that distributes light in a relatively wide angle, similar to that of an incandescent light bulb.

SUMMARY

One of the broader forms of the present disclosure involves an apparatus. The apparatus includes: a cap that houses a photonic device therein, the cap including: a first segment coated with a reflective material; and a second segment coupled to the first segment, the second segment being free of a reflective coating; wherein the first segment is disposed farther away from the photonic device than the second segment.

In some embodiments, the cap further includes a third segment that is transparent, and wherein the second segment is disposed between the first segment and the third segment.

In some embodiments, the second segment has a textured surface.

In some embodiments, the textured surface includes one of: a roughened surface and a surface containing a plurality of patterns.

In some embodiments, the textured surface has a gradient textured profile such that a portion of the surface closer to the first segment of the cap is more textured than a portion of the surface farther away from the first segment of the cap.

In some embodiments, the first segment is wider than the second segment.

In some embodiments, the first segment of the cap includes a side surface and an end surface; the second segment of the cap is coupled to the side surface of the first segment; and the photonic device is operable to project radiation toward the end surface.

In some embodiments, the side portion has a sloped surface; and the end portion has one of: a curved surface and a substantially flat surface.

In some embodiments, the apparatus further includes a heat sink, and wherein the second segment includes: a first opening coupled to the first segment of the cap; and a second opening coupled to the heat sink.

In some embodiments, a portion of the heat sink coupled to the second opening forms an acute angle with respect to a plane on which the second opening resides; and the acute angle is at about or greater than 60 degrees.

One of the broader forms of the present disclosure involves a lighting device. The lighting device includes: a cap structure partially coated with a reflective material; one or more lighting-emitting devices disposed within the cap structure; and a thermal dissipation structure coupled to the cap structure in a first direction; wherein: an interface between the thermal dissipation structure and the cap structure extends in a second direction substantially perpendicular to the first direction; and a portion of the thermal dissipation structure intersects the interface at an angle that is in a range from about 60 degrees to about 90 degrees.

In some embodiments, the thermal dissipation structure protrudes in the second direction.

In some embodiments, the cap structure includes: a first substructure coated with the reflective material; and a second substructure that is non-reflective and at least partially textured.

In some embodiments, the second substructure is at a widest point at an interface between the first substructure and the second substructure.

In some embodiments, the first substructure includes an end surface that is substantially flat or curved.

In some embodiments, the second substructure includes a non-textured surface that is transparent and a textured surface that is less transparent than the non-textured surface; the textured surface has a non-uniform texturing density distribution; and the textured surface is located closer to the cap structure than the non-textured surface.

One of the broader forms of the present disclosure involves a lamp. The lamp includes: a cap that includes: an end portion that is reflective and a side portion that is non-reflective, wherein at least a circumferential area of the side portion is textured, and wherein the end portion is wider than the side portion; an lighting-emitting package located within the cap; and an outwardly-protruding heat sink coupled to the cap, wherein an acute angle of greater than 60 degrees is formed between a portion of the heat sink coupled to the cap and a plane formed from a rim of the cap.

In some embodiments, the side portion of the cap includes an additional circumferential area that is non-textured and transparent.

In some embodiments, the textured segment of the side portion has a texturing density that is a function of a distance to the end portion of the cap.

In some embodiments, the side portion of the cap has a tapered profile; and the end portion is at least as wide as the side portion.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for the sake of simplicity and clarity.

When turned on, light-emitting diode (LED) devices may emit radiation such as different colors of light in a visible spectrum, as well as radiation with ultraviolet or infrared wavelengths. Compared to traditional light sources (e.g., incandescent light bulbs), LED devices offer advantages such as smaller size, lower energy consumption, longer lifetime, variety of available colors, and greater durability and reliability. These advantages, as well as advancements in LED fabrication technologies that have made LED devices cheaper and more robust, have added to the growing popularity of LED devices in recent years.

Some of the LED-based applications include LED illumination devices, for example, LED lamps. These LED illumination devices are capable of replacing traditional illumination devices (such as incandescent light bulbs) in many aspects. However, conventional LED illumination devices may suffer from drawbacks involving non-uniform light distribution intensity (or luminous intensity or lumen density). For example, conventional LED illumination devices may have weaker light intensity in a backward direction compared to a front direction along which light is projected. These characteristics make it more difficult for conventional LED illumination devices to conform with the light distribution patterns of incandescent illumination devices, and as such are considered undesirable characteristics for conventional LED illumination devices.

Figure 1:
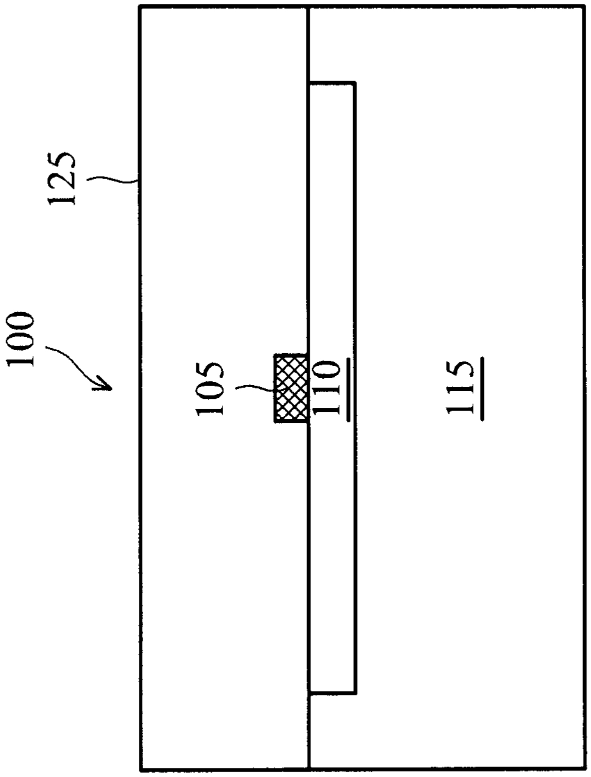
FIG. 1 is a cross-sectional block diagram of an illumination device constructed according to one or more embodiments of the present disclosure.
Figure 4:
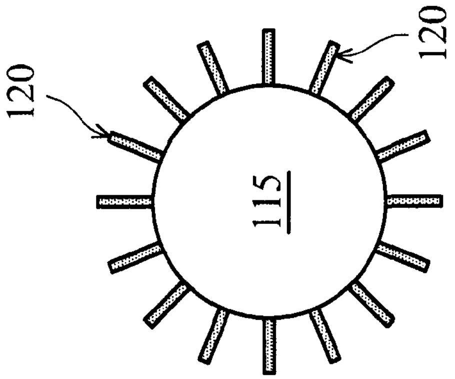
FIG. 4 is a top view of a heat sink of the illumination device of FIG. 1 constructed according to various embodiments of the present disclosure;.
Figure 3:
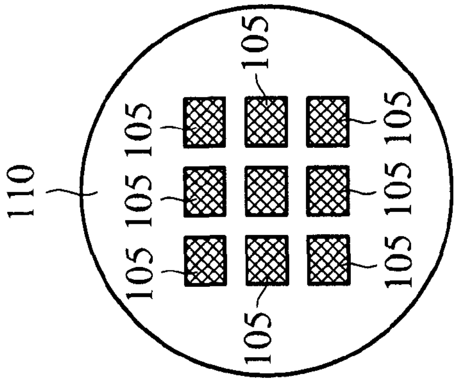
FIGS. 2 and 3 are top views of a light-emitting diode (LED) device incorporated in the illumination device of FIG. 1 and constructed according to various embodiments of the present disclosure.
Figure 2:
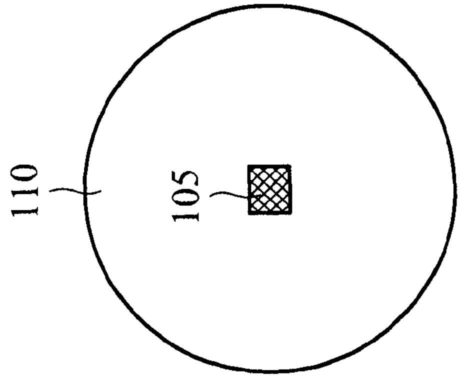

According to various aspects of the present disclosure, described below is an improved LED illumination device that substantially overcomes the non-uniform light distribution issues associated with conventional LED illumination devices. In more detail, FIG. 1 is a diagrammatic cross-sectional side view of an illumination device 100 according to certain embodiments of the present disclosure. FIGS. 2 and 3 are diagrammatic top views of one or more light-emitting diode (LED) device(s) incorporated in the illumination device 100 according to certain embodiments of the present disclosure. FIG. 4 is a diagrammatic top view of a thermal dissipation structure of the illumination device 100 according to certain embodiments of the present disclosure. With reference to FIGS. 1 through 4, the illumination device 100 and the method making the same are collectively described. Note that FIGS. 1 to 4 have been simplified to focus on the inventive concepts of the present disclosure.

The illumination device 100 may include one LED device 105 (e.g., illustrated in FIG. 2) or a plurality of LED devices 105 (e.g., illustrated in FIG. 3) as a light emitting source. The LED devices may also be referred to as LED chips or LED dies. When the illumination device 100 includes multiple LED chips, the multiple LED chips are configured in an array for a desired illumination effect. For example, the multiple LED chips are configured such that the collective illumination from individual LED chips contributes to the emitted-light in a large angle with enhanced illumination uniformity. In another example, each of the multiple LED chips is designed to provide visual light of different wavelengths or spectrum, such as a first subset of LED chips for blue, and a second subset of LED chips for red. In some cases, the various LED chips collectively provide white illumination or other illumination effects according to particular applications. In various embodiments, each of the LED chips may further include one LED or a plurality of LEDs. As one example, when an LED chip includes multiple LEDs, those devices are electrically connected in series for high voltage operation, or further electrically connected in groups of series-coupled diodes in parallel to provide redundancy and device robustness.

The device compositions of each LED device 105 will now be described in greater detail. The LED device 105 includes oppositely doped semiconductor layers. In some embodiments, the oppositely doped semiconductor layers each contain a “III-V” family (or group) compound. In more detail, a III-V family compound contains an element from a “III” family of the periodic table, and another element from a “V” family of the periodic table. For example, the III family elements may include Boron, Aluminum, Gallium, Indium, and Titanium, and the V family elements may include Nitrogen, Phosphorous, Arsenic, Antimony, and Bismuth. In some embodiments, the oppositely doped semiconductor layers include a p-doped gallium nitride (GaN) material and an n-doped gallium nitride material, respectively. The p-type dopant may include Magnesium (Mg), and the n-type dopant may include Carbon (C) or Silicon (Si).

According to various embodiments, each LED device 105 also includes a multiple-quantum well (MQW) layer that is disposed in between the oppositely doped layers. The MQW layer includes alternating (or periodic) sub-layers of active material, such as gallium nitride and indium gallium nitride (InGaN). For example, the MQW layer may include a number of gallium nitride sub-layers and a number of indium gallium nitride sub-layers, wherein the gallium nitride sub-layers and the indium gallium nitride sub-layers are formed in an alternating or periodic manner. In one embodiment, the MQW layer includes ten sub-layers of gallium nitride and ten sub-layers of indium gallium nitride, where an indium gallium nitride sub-layer is formed on a gallium nitride sub-layer, and another gallium nitride sub-layer is formed on the indium gallium nitride sub-layer, and so on and so forth. Each of the sub-layers within the MQW layer is oppositely doped from its adjacent sub-layer. That is, the various sub-layers within the MQW layer are doped in an alternating p-n fashion. The light emission efficiency depends on the number of layers of alternating layers and their thicknesses.

The doped layers and the MQW layer may all be formed by epitaxial growth processes known in the art. After the completion of the epitaxial growth processes, an LED device is created by the disposition of the MQW layer between the doped layers. When an electrical voltage (or electrical charge) is applied to the doped layers of the LED devices 105, the MQW layer emits light. The color of the light emitted by the MQW layer corresponds to the wavelength of the radiation. The radiation may be visible, such as blue light, or invisible, such as ultraviolet (UV) light. The wavelength of the light (and hence the color of the light) may be tuned by varying the composition and structure of the materials that make up the MQW layer.

In some embodiments, the LED device 105 includes phosphor to convert the emitted light to a different wavelength of light. The scope of embodiments is not limited to any particular type of LED, nor is it limited to any particular color scheme. In some embodiments, one or more types of phosphors are disposed around the light-emitting diode for shifting and changing the wavelength of the emitted light, such as from ultra-violet (UV) to blue or from blue to yellow. The phosphor is usually in powder and is carried in other material such as epoxy or silicone (also referred to as phosphor gel). The phosphor gel is applied or molded to the LED device 105 with suitable technique and can be further shaped with proper shape and dimensions.

The LED device 105 may also contain electrodes for establishing electrical connections to its n-type and p-type layers, respectively. Each LED device may be attached to a circuit board 110, which may be considered a portion of a carrier substrate. Wiring interconnections may be used to couple the electrodes of the LED device 105 to electrical terminals on the circuit board. The LED device 105 may be attached to the circuit board 110 through various conductive materials, such as silver paste, soldering, or metal bonding. In further embodiments, other techniques, such as through silicon via (TSV) and/or metal traces, may be used to couple the LED device 105 to the circuit board 110.

If more than one LED device 105 is used, those LED devices may share one circuit board 110. In certain embodiments, the circuit board 110 is a heat-spreading circuit board to effectively distribute and dissipate heat. In one example, a metal core printed circuit board (MCPCB) is utilized. MCPCBs can conform to a multitude of designs. An exemplary MCPCB includes a base metal, such as aluminum, copper, a copper alloy, and/or the like. A thin dielectric layer is disposed upon the base metal layer to electrically isolate the circuitry on the printed circuit board from the base metal layer below and to allow thermal conduction. The LED device 105 and its related traces can be disposed upon the thermally conductive dielectric material.

In some examples, the metal base is directly in contact with a heat sink (discussed in more detail below), whereas in other examples, an intermediate material between the heat sink and the circuit board 110 is used. Intermediate materials can include, e.g., double-sided thermal tape, thermal glue, thermal grease, and the like. Various embodiments can use other types of MCPCBs, such as MCPCBs that include more than one trace layer. The circuit board 110 may also be made of materials other than MCPCBs. For instance, other embodiments may employ circuit boards made of FR-4, ceramic, and the like.

In some embodiments, the circuit board 110 may further include a power conversion module. Electrical power is typically provided to indoor lighting as alternating current (AC), such as 120V/60 Hz in the United States, and over 200V and 50 Hz in much of Europe and Asia, and incandescent lamps apply the ac power directly to the filament in the bulb. The LED device 105 utilizes the power conversion module to change power from the typical indoor voltages/frequencies (high voltage AC) to power that is compatible with the LED device 105 (low voltage direct current(DC)). In other examples, the power conversion module may be provided separately from the circuit board 110.

The LED device 105 and the circuit board 110 are attached to a thermal dissipation structure 115. The thermal dissipation structure 115 functions as a heat sink to dissipate the heat generated by the LED device 105. The thermal dissipation structure 115 includes a base to provide mechanical support to the LED device 105. According to various embodiments, the thermal dissipation structure 115 includes a metal, such as aluminum, copper, or other suitable metal. The thermal dissipation structure 115 can be formed by a suitable technique, such as extrusion molding or die casting. According to various aspects of the present disclosure, the thermal dissipation structure 115 is configured to avoid blocking light emitted by the LED device 105. The minimized light-blocking design of the thermal dissipation structure 115 is discussed in more detail below with reference to FIGS. 5 and 7.

To effectuate efficient heat transfer, the thermal dissipation structure 115 may include a plurality of outwardly-protruding fins 120, which are illustrated in the top view of FIG. 4. The fins 120 are not specifically shown in the diagrammatic view of FIG. 1 for the sake of simplicity. The fins 120 have substantial surface area exposed to the ambient atmosphere, thereby increasing a rate of heat transfer from the illumination device 100 to the ambient atmosphere.

As shown in FIG. 1, the illumination device 100 also includes a cap 125 configured to house the LED device(s) therein. The cap 125 is designed to increase the light efficiency and uniformity of the illumination device 100. Since FIG. 1 is a simplified diagrammatic view, the shapes and geometries of the cap 125 and the thermal dissipation structure 125 are not specifically illustrated in FIG. 1. Instead, the shapes and geometries of the cap 125 and the thermal dissipation structure 115 are discussed in more detail below with reference to FIGS. 5-7

Figure 5:
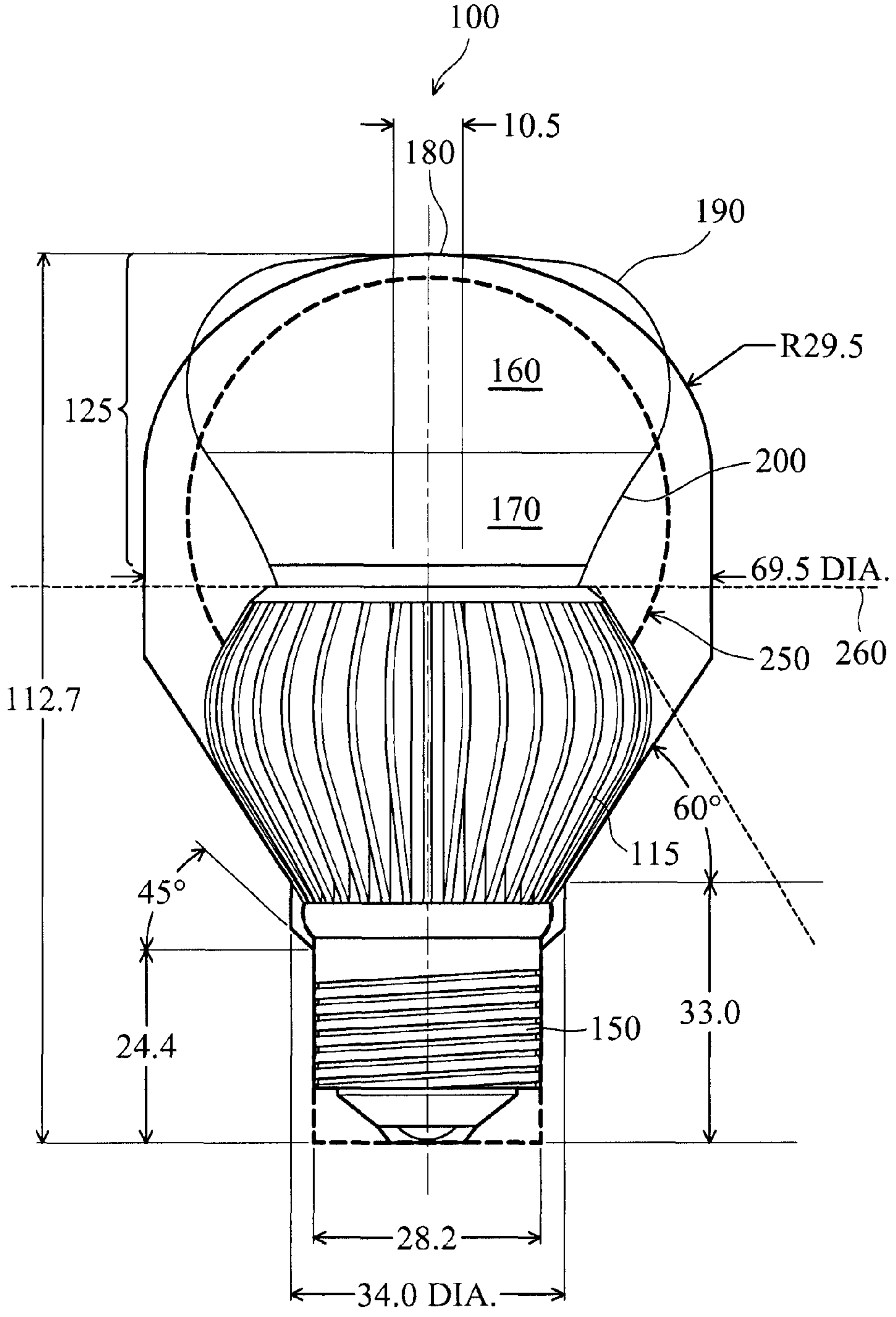
FIG. 5 is a cross-sectional view of an LED illumination device constructed according to some embodiments of the present disclosure.

Referring to FIG. 5, a cross-sectional view of the illumination device 100 discussed above is shown according to various embodiments of the present disclosure. In addition to the thermal dissipation structure 115 and the cap 125, the illumination device 100 also includes a screw cap 150 for coupling the illumination device 100 into a socket (not illustrated). Electricity may be provided to the illumination device through the screw cap 150. The LED device 105 is not illustrated herein, as it may be hidden within the cap 125.

According to various aspects of the present disclosure, the illumination device 100 is designed to comply with the requirements set forth by American National Standard Institute (ANSI) C78.20-2003 specification for electric lamps. For example, the dimensions (measured in millimeters in terms of size or degrees in terms of angle) of various components of the illumination device 100 illustrated in FIG. 5 comply with the bulb defined by Figure C78.20-211 of the ANSI specification.

The illumination device 100 also complies with the Energy Star® Program Requirements for Integral LED Lamps. To ensure that these Energy Star® Requirement are met, the shape and geometry of the illumination device 100 are carefully designed. In some embodiments, the cap 125 includes an upper portion 160 and a lower portion 170. The upper portion 160 is positioned further away from the LED device(s) housed within the cap 125 than the lower portion 170. The upper portion 160 is wider (measured in a horizontal direction in FIG. 5) than the lower portion 170.

The upper portion 160 includes an end surface 180. In some embodiments, the end surface 180 is substantially flat. In other embodiments, the end surface 180 is curved or rounded. The end surface 180 faces the LED device(s), and the light emitted by the LED device(s) are projected toward the end surface 180. Thus, it may be said that the end surface 180 is at a front side of the illumination device 100. The upper portion 160 also includes a side surface 190 attached to the end surface 180. The side surface 190 may be curved or sloped and may circumferentially surround the LED device(s) housed below.

The lower portion 170 of the cap 125 has a side surface 200 attached to the side surface 190 of the upper portion 190. From the cross-sectional side view, the side surface 200 has a tapered or slanted profile. The side surface 200 also circumferentially surrounds the LED device(s) housed within the cap 125. Alternatively stated, the lower portion 170 may be viewed as having an upper opening (or upper interface) attached to the upper portion 160 as well as a lower opening (or lower interface) attached to the thermal dissipation structure 115. Note that although the surfaces 180, 190, and 200 are described as discrete entities, they may indeed constitute a continuous structure that can either be formed at the same time, or formed separately initially but joined together later, for example by an ultrasonic welding process.

In some embodiments, the upper portion 160 is coated with a light reflective material. As such, as light emitted by the LED device(s) housed within the cap 125 propagates upwards away from the LED device(s), some of the light is reflected upon hitting the upper portion 160 (particularly upon hitting the end surface 180) back toward the LED device(s) below. In certain embodiments, the upper portion 160 may also be coated with diffuser particles to increase the scattering of light.

Meanwhile, the lower portion 170 is free of a reflective coating, meaning that it causes minimal or no light reflection. Instead, the lower portion 170 has a textured side surface 200 designed to diffuse or scatter light. In some embodiments, the textured surface 200 is a roughened surface, meaning that the surface is not smooth. As an example, a roughened surface may be formed by a sandblasting technique. In other embodiments, the textured surface 200 contains a plurality of small patterns, such as triangles, circles, squares, or other random polygons. In further embodiments, the textured surface 200 may have a gradient textured profile, such that the texturing density (for example, the number of small patterns per unit area) increases the further up it goes (i.e., closer to the upper portion 160). In certain embodiments, the surfaces of the upper portion 160 may be textured as well.

The selective coating configuration and geometric design of the cap 125 help increase backward light intensity of the illumination device 100. The backward direction may be defined as the opposite direction from which the light is emitted from the LED device(s) of the illumination device. In the embodiments shown in FIG. 5, the backward direction is a downward direction, away from the cap 125 but toward the screw cap 150. The reflective coating applied on the surfaces of the upper portion 160 help reflect some amount of incident light toward the backward direction (i.e., downwards). The reflected light can propagate through the lower portion 170 without reflection, since the lower portion 170 is free of the reflective coating. The light traveling out of the lower portion 170 in the backward direction helps increase the intensity of the backward light compared to conventional LED light bulbs. The textured surface 200 of the lower portion 170 reduces the glare of the light propagating out of the lower portion 170, as the light will be more diffused or scattered. Thus, the reflected light can also achieve a more uniform lumen density.

Figure 6:
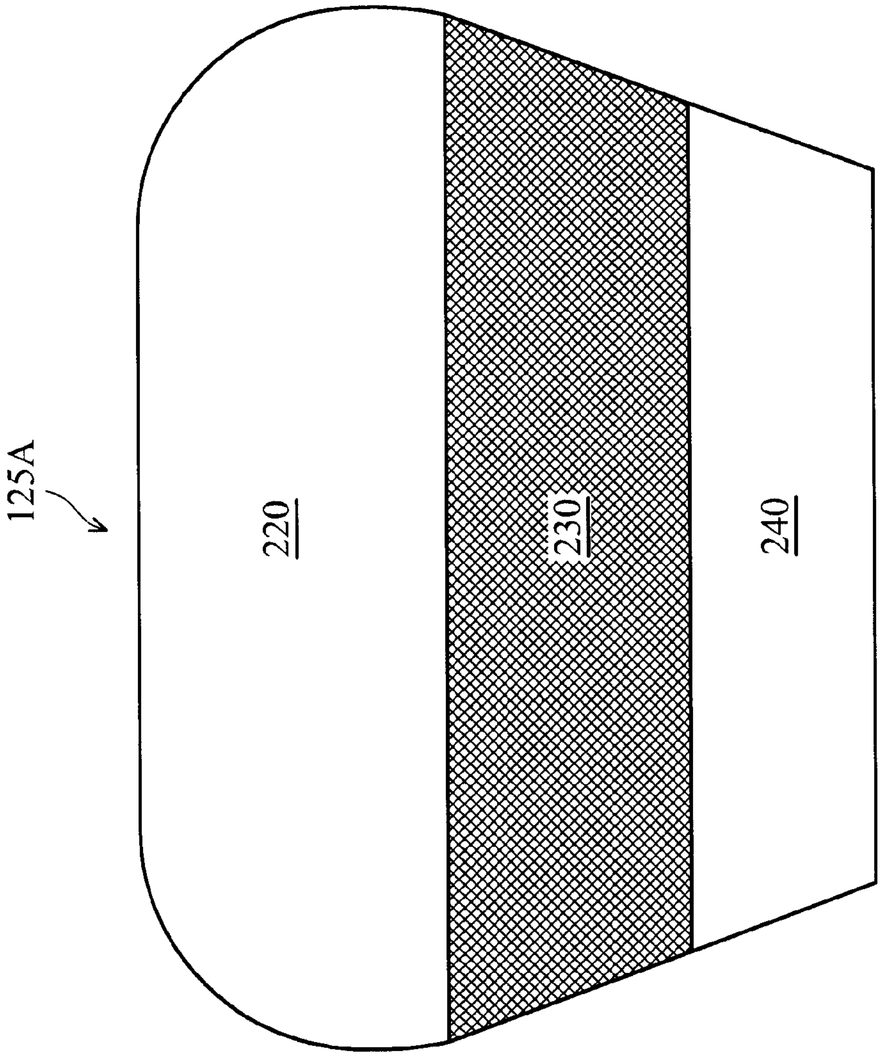
FIG. 6 is a cross-sectional view of a diffuser cap that is a part of the LED illumination device constructed according to some embodiments of the present disclosure.

The cap 125 shown in FIG. 5 is one of many embodiments according to various aspects of the present disclosure. For example, FIG. 6 illustrates a cross-sectional side view of another embodiment of the cap 125 as cap 125A. The cap 125A has an upper portion 220, a middle portion 230, and a lower portion 240. The upper portion 220 is located farthest from the LED device(s) (not illustrated) housed below, and the lower portion 240 is located nearest to the LED device(s). The middle portion 230 is disposed between the upper portion 220 and the lower portion 240.

Similar to the upper portion 160 of the embodiments illustrated in FIG. 5, the upper portion 220 shown in FIG. 6 is also coated with a reflective film so as to reflect incident light. The shape of the upper portion 220 may vary from embodiment to embodiment to achieve a desired reflection pattern or reflection angle. Similar to the lower portion 170 of the embodiments illustrated in FIG. 5, the middle portion 230 shown in FIG. 6 has a textured surface, for example a roughened surface by way of sandblasting or a surface having a plurality of small patterns. Thus, light propagating through the middle portion 230 may be diffused or scattered to achieve better uniformity. The lower portion 240 is substantially transparent. Thus, light may freely travel through the lower portion 240.

Figure 7:
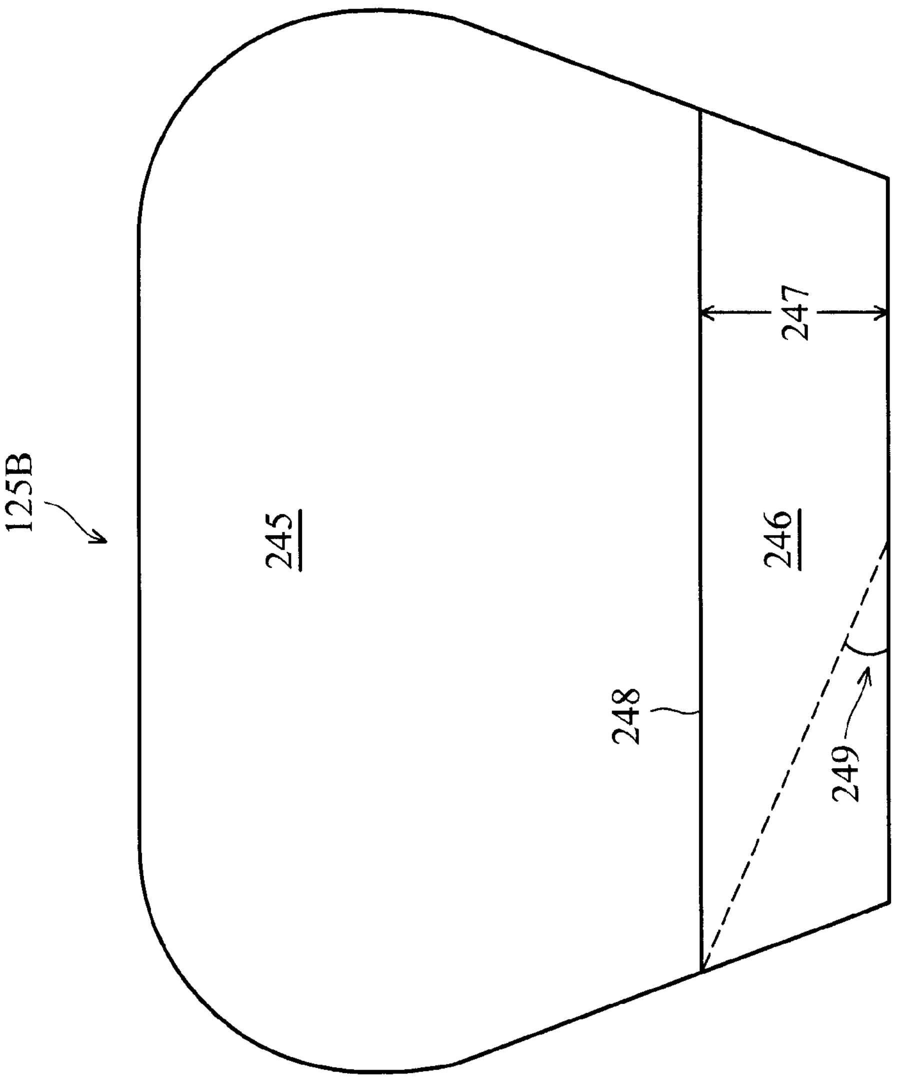
FIG. 7 is a cross-sectional view of a diffuser cap that is a part of the LED illumination device constructed according to some other embodiments of the present disclosure.

FIG. 7 is a diagrammatic cross-sectional view of a diffuser cap 125B that is another embodiment of the cap 125 of FIG. 5. The diffuser cap 125B has a first coating area 245 and a second coating area 246. The first coating area 245 is coated with a reflective and diffusive material, as is the second coating area 246. The reflective and diffusive material may be similar to the reflective film described above. However, the first coating area 245 has a higher coating concentration level than the second coating area 246. In some embodiments, the first coating area 245 and the second coating area 246 each have a substantially uniform respective coating concentration level (though the coating concentration level for the coating 245 is still greater than that of the coating area 246). In other embodiments, the coating concentration levels may vary within each of the coating areas 245 and 246. For example, the coating concentration level within the coating area 245 may decrease progressively from the top of the area 245 to the bottom of the area 245. In any case, since both the first coating area 245 and the second coating area 246 are coated, the cap 125B may be referred to as a dual coating structure. Though the cap 125 only contains two coating areas, any other number of coating areas may be implemented in alternative embodiments, where each separate coating area has its own coating characteristic.

In the embodiments shown in FIG. 7, the second coating area 246 has a height 247, which defines a boundary 248 between the first coating area 245 and the second coating area 246. An angle 249 is also formed by the LED plane and a virtual line (shown as the dashed line in FIG. 7) extending from the center of the LED plane to the intersection between the boundary 248 and the edge of the cap 125B. The height 247 and the angle 249 have been carefully configured to optimize the light output uniformity of the illumination device 100 (FIG. 5). In some embodiments, the height 247 is in a range from about 14.3 millimeters to about 15.3 millimeters, and the angle 249 is in a range from about 19 degrees to about 21 degrees.

A method of manufacturing the cap 125 (or the caps 125A-125B) is now described according to some embodiments. The cap 125 may be initially made from a poly carbonate material and molded into a proper shape. Next, diffuser particles and reflector particles are mixed together with resin to form a mixed solution. The mixed solution is loaded into a dispenser container. The dispenser container may then be used to dispense the solution on the cap 125. In this manner, the reflective film is coated onto the cap 125. Thereafter, the cap is cured at a predetermined temperature for a predetermined amount of time. For example, in some embodiments, the cap 125 may be cured at a temperature ranging from about 20 degrees Celsius to about 30 degrees Celsius for about 5 minutes to about 15 minutes. After the curing process is completed, a sand blasting process is performed on a predetermined region of the cap (for example, the lower portion 170 of FIG. 5 or the middle portion 230 of FIG. 6) to form a textured segment of the cap.

In some embodiments, the coating scheme may be implemented according to the teachings of patent application Ser. No. 13/275,550, titled "Coated Diffuser Cap for LED Illumination Device," and file on Oct. 18, 2011, the disclosure of which is hereby incorporated by reference in its entirety.

Other alternative configurations of the cap 125 are contemplated according to design needs and manufacturing concerns, but they are not discussed herein for reasons of simplicity.

Referring back to FIG. 5, the thermal dissipation structure 115 is now described in greater detail. One end of the thermal dissipation structure 115 is coupled to the cap 125, and another end of the thermal dissipation structure 115 is coupled to the screw cap 150. These end portions of the thermal dissipation structure 115 are narrower than a middle portion of the thermal dissipation structure 115. Stated differently, the thermal dissipation structure 115 has a "bulging" middle section. An angle 250 is formed by the thermal dissipation structure 115 and a horizontal plane 260 through which the cap 125 couples to the thermal dissipation structure 115. In other words, an upper portion of the thermal dissipation structure 115 has a slanted profile or surface that intersects the plane 260, where the plane 260 is perpendicular to the "front" direction along which light is emitted by the LED device(s), or the "back" direction opposite the front direction. In some embodiments, the angle 250 is acute and is greater than or equal to about 60 degrees. In some embodiments, the angle 250 is in a range between about 60 degrees and about 90 degrees.

The angle 250 is selected so as to let reflected light (reflected by the upper portion 160 of the cap 125) propagate through the lower portion 170 without being blocked by the thermal dissipation structure 115. Alternatively stated, the upper end portion of the thermal dissipation structure 115 is about as wide as the end portion of the cap 125 coupled thereto. Much of the thermal dissipation structure 115 is actually narrower than the a significant portion of the cap 125. Thus, light passing through the cap 125 towards the back of the illumination device 100 can mostly travel without hindrance, at least up till the bulging middle section of the thermal dissipation structure. Such design results in enhanced light intensity in the backward direction. In comparison, conventional LED illumination designs often fail to take the backward lighting intensity into account and may use a thermal dissipation structure that is much wider than the cap. Consequently, light propagating towards the back may be immediately blocked by the thermal dissipation structure, thereby leading to poor backward light intensity.

Figure 8:
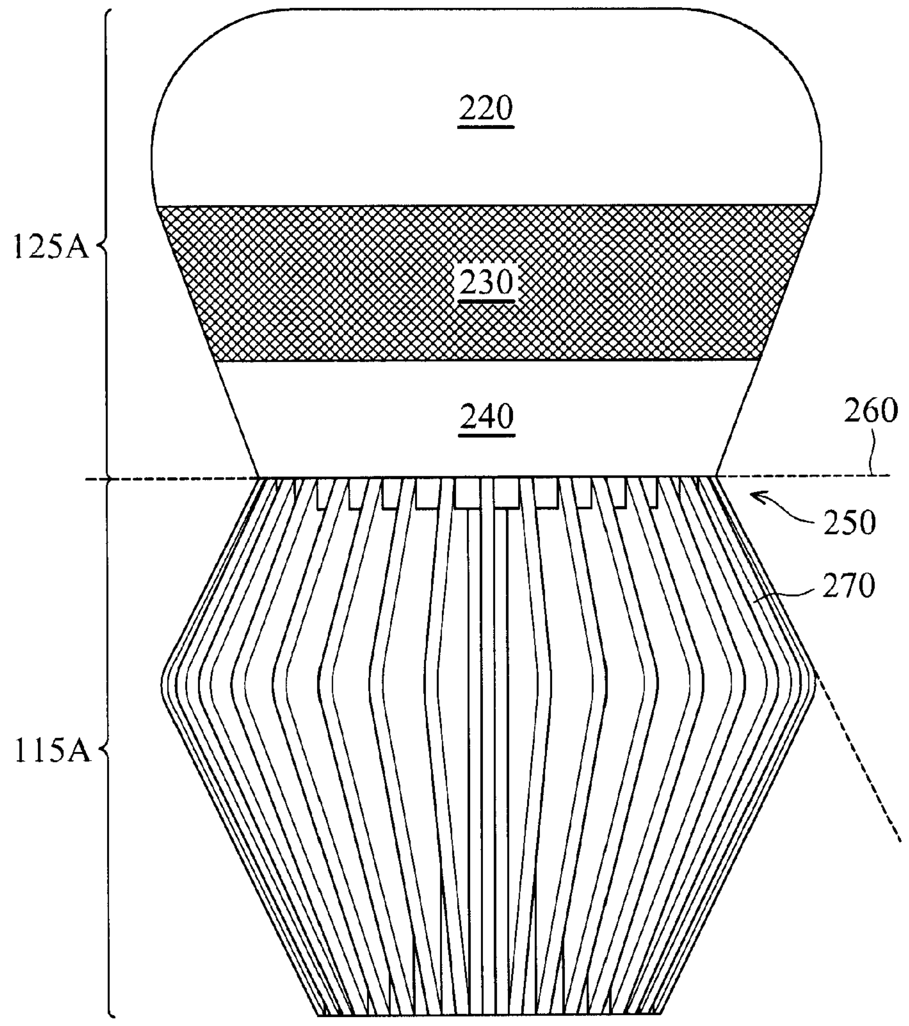
FIG. 8 is a cross-sectional view of a diffuser cap coupled to a thermal dissipation structure constructed according to some embodiments of the present disclosure.

FIG. 8 is a diagrammatic cross-sectional view of another embodiment of the thermal dissipation structure 115A. The cap 125A is coupled to the thermal dissipation structure 115A in the embodiment illustrated in FIG. 8, but it is understood that any other embodiment of the cap 125 may be used instead. The cap 125A is coupled to the thermal dissipation structure 115A in a direction perpendicular to the direction of the plane 260. Thus, if the plane 260 is a horizontal plane, then the coupling between the cap 125A and the thermal dissipation structure 115A is done in a vertical direction. The screw cap is not shown herein for the sake of simplicity.

The thermal dissipation structure 115A still has a bulging middle section that protrudes in a direction parallel to the plane 260 (both horizontal in this case). However, compared to the thermal dissipation structure 115 shown in FIG. 5, the thermal dissipation structure 115A in FIG. 8 has a more angular bulging middle section. In other words, the thermal dissipation structure 115 in FIG. 5 has a more rounded or curved tip at its widest point, whereas the thermal dissipation structure 115A in FIG. 8 has a sharper and more angular tip at its widest point. An angle 250 is still formed by the intersection between the horizontal plane 260 and a slanted surface 270 of the upper portion of the thermal dissipation structure 115A. In some embodiments, the angle 250 is in a range from about 60 degrees to about 90 degrees.

Similar to the embodiment shown in FIG. 5, the embodiment of the thermal dissipation structure 115A of FIG. 8 also offers minimized blocking of backward light. The shape of the thermal dissipation structure 115A is tuned so as to let a significant amount of reflected light travel toward the backside with being obstructed by the thermal dissipation structure 115A.

The embodiments of the thermal dissipation structure 115 and 115A shown in FIGS. 5 and 7 are merely examples and are not intended to be limiting. Other designs consistent with the spirit and the scope of the present disclosure may be employed in alternative embodiments. For example, though the texts above loosely refer to a bulging "middle" section, the "middle" section is not necessarily located exactly at a mid-point of the thermal dissipation structure. Rather, the location of the bulging tip may vary (for example, up and down along the thermal dissipation structure) depending on design needs and manufacturing concerns. Furthermore, the thermal dissipation structure 115 may or may not employ a "fin" type structure to facilitate the dissipation of heat. In embodiments where fins are used, the number, size, shape, spacing, and location of the fins may also vary from embodiment to embodiment.

The embodiments of the present disclosure discussed above offer advantages over existing methods. However, not all advantages of the present disclosure are necessarily discussed herein, and other embodiments may offer different advantages, and that no particular advantage is required for any embodiment. One advantage is that the illumination device achieves good uniformity due at least in part to the design of the cap structure discussed above. For example, the textured surface of the cap helps diffuse light and makes the light distribution more uniform. Another advantage is the enhanced backward light intensity or lumen density. This is achieved at least in part due to the cap being coated with a reflective material so as to reflect light backwards. In addition, the design of the thermal dissipation structure also contributes to the improved backward light intensity because the thermal dissipation structure is designed to minimize backward light blocking.

Figure 9:
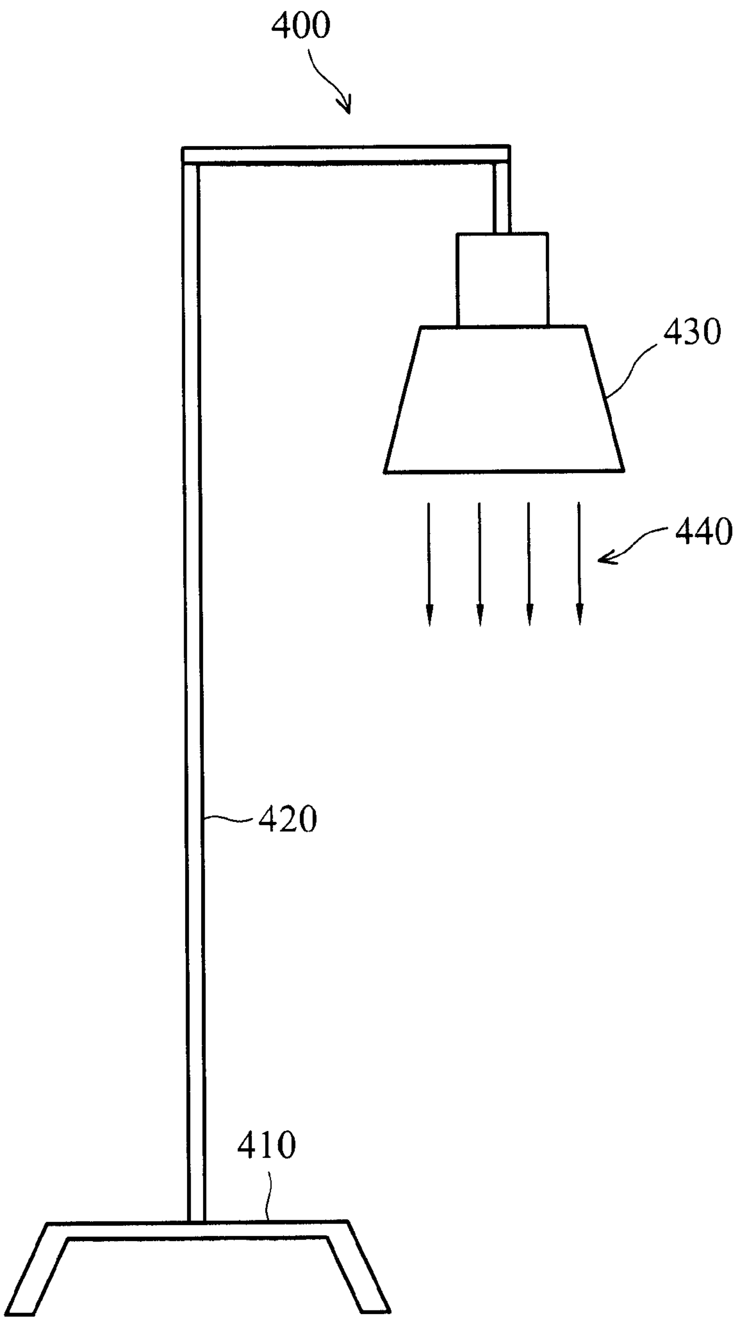
FIG. 9 is a diagrammatic view of a lighting module that includes a photonic lighting apparatus of FIGS. 1 and 2 according to various aspects of the present disclosure.

FIG. 9 illustrates a simplified diagrammatic view of a lighting module 400 that includes some embodiments of the illumination device 100 discussed above. The lighting module 400 has a base 410, a body 420 attached to the base 410, and a lamp 430 attached to the body 420. In some embodiments, the lamp 430 is a down lamp (or a down light lighting module). In other embodiments, the lamp 430 may be a desk lamp or another suitable lamp.

The lamp 430 includes the illumination device 100 discussed above with reference to FIGS. 1-7. In other words, the lamp 430 of the lighting module 400 includes an LED-based light source, a diffuser cap that encapsulate the LED light source therein, and a heat sink that dissipates the heat generated by the LED light source. The diffuser cap is partially coated with a reflective material and partially textured according to some embodiments. The heat sink is configured to minimize blocking of backwardly-projected light according to some embodiments. Due at least in part to the advantages discussed above, the lamp 430 is operable to efficiently project light beams 440 that have superior uniformity and less glare compared to light projected by traditional LED lamps. In addition, the backward light intensity may be improved over conventional LED lamps as well.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A lighting instrument, comprising:

a light-emitting diode (LED); and a cap that houses the LED therein, the cap including a first portion and a second portion, wherein the first portion has a first side surface circumferentially surrounding the LED and is located closer to the LED than the second portion, wherein the first portion has a roughened surface, wherein the second portion has a second side surface circumferentially surrounding the LED and has a smoother surface than the first portion, and wherein the first side surface of the first portion is connected to the second side surface of the second portion.

2. The lighting instrument of claim 1, wherein the second portion is coated with diffuser particles.

3. The lighting instrument of claim 1, wherein the second portion has a greater lateral dimension than the first portion.

4. The lighting instrument of claim 1, wherein the first portion has a gradient textured profile for the roughened surface toward the second portion.

5. The lighting instrument of claim 1, wherein the cap further includes a third portion that is transparent and circumferentially surrounds the LED.

6. The lighting instrument of claim 1, wherein the cap has a tapered side surface and a flat end surface.

7. The lighting instrument of claim 1, further comprising a heat sink coupled to the cap through an interface, wherein the heat sink includes a plurality of outwardly-protruding fins.

8. The lighting instrument of claim 7, wherein at least one of the fins intersects the interface at an angle between about 60 degrees and about 90 degrees.

9. A lighting instrument, comprising:

a thermal dissipation structure having a plurality of outwardly-protruding fins;

a light-emitting diode (LED) disposed over the thermal dissipation structure; and a cap disposed over the thermal dissipation structure, and the LED, and comprising a first portion and a second portion over the first portion, wherein the first portion has a textured surface circumferentially surround the LED, and wherein the second portion is located over the first portion and coated with a reflective film, and circumferentially surrounds the LED.

10. The lighting instrument of claim 9, wherein the cap includes a third portion that is transparent and circumferentially surrounds the LED.

11. The lighting instrument of claim 9, wherein the textured surface has a gradient textured surface profile.

12. The lighting instrument of claim 9, wherein the cap has a side profile that slopes toward the thermal dissipation structure.

13. The lighting instrument of claim 9, wherein the thermal dissipation structure defines an acute angle with a horizontal plane, wherein the acute angle is between about 60 degrees and about 90 degrees.

14. A method, comprising:

providing a cap;

mixing diffuser particles and reflector particles together to form a mixed solution;

dispensing the mixed solution onto the cap;

curing the cap after the mixed solution has been dispensed; and performing a sandblasting process on a predetermined region of the cap to form a textured segment of the cap.

15. The method of claim 14, wherein the providing the cap comprises molding a poly carbonate material into the cap.

16. The method of claim 14, wherein the curing process is performed at a temperature ranging from about 20 degrees Celsius to about 30 degrees Celsius for about 5 minutes to about 15 minutes.

17. The method of claim 14, further comprising coupling a thermal dissipation structure to the cap, the thermal dissipation structure having a plurality of outwardly-protruding fins.

18. The method of claim 17, wherein the sandblasting process is performed such that the textured segment is located closer to the thermal dissipation structure than a non-textured segment of the cap.

* * * * *